United States Patent
Kim et al.

(10) Patent No.: US 8,937,894 B2
(45) Date of Patent: Jan. 20, 2015

(54) METHOD AND APPARATUS FOR ALLOCATING MULTICAST RESOURCE AND METHOD AND APPARATUS FOR RECEIVING MULTICAST RESOURCE ALLOCATION INFORMATION

(75) Inventors: Eunkyung Kim, Daejeon (KR); Sung Kyung Kim, Daejeon (KR); Sung Cheol Chang, Daejeon (KR); Won-Ik Kim, Daejeon (KR); Mi-Young Yun, Daejeon (KR); Hyun Lee, Daejeon (KR); Chul Sik Yoon, Daejeon (KR); Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 70 days.

(21) Appl. No.: 13/336,565

(22) Filed: Dec. 23, 2011

(65) Prior Publication Data
US 2012/0163276 A1 Jun. 28, 2012

(30) Foreign Application Priority Data

Dec. 24, 2010 (KR) ......... 10-2010-0134915
Mar. 4, 2011 (KR) ......... 10-2011-0019654
Jul. 11, 2011 (KR) ......... 10-2011-0068535
Oct. 31, 2011 (KR) ......... 10-2011-0112476
Nov. 3, 2011 (KR) ......... 10-2011-0113914

(51) Int. Cl.
*G08C 17/00* (2006.01)
*H04W 48/08* (2009.01)
(Continued)

(52) U.S. Cl.
CPC ............ *H04W 48/08* (2013.01); *H04W 4/06* (2013.01); *H04W 52/0216* (2013.01); *H04W 52/0219* (2013.01); *H04W 76/002* (2013.01); *H04W 72/042* (2013.01); *H04W 72/1289* (2013.01)

USPC ........... 370/311; 370/312; 370/208; 370/329; 370/336; 370/349

(58) Field of Classification Search
CPC ............ H04W 48/08; H04W 72/0219; H04W 76/002; H04W 52/0216; H04W 4/06; H04W 72/1289; H04W 72/042
USPC ......... 370/208, 312, 329, 336, 338, 349, 311; 455/509
See application file for complete search history.

(56) References Cited

U.S. PATENT DOCUMENTS 6,078,959 A * 6/2000 Wright et al. ................. 709/227
7,697,465 B2 * 4/2010 Wu et al. ........................ 370/312
(Continued)

FOREIGN PATENT DOCUMENTS

KR 2010-0133876 A 12/2010
WO WO-2010-134780 A2 11/2010

OTHER PUBLICATIONS

Eunkyung Kim et al., "Downlink Control for Multicast in IEEE 802.16n", IEEE C802.16n-11/0047, Mar. 6, 2011.
(Continued)

*Primary Examiner* — Chandrahas Patel
*Assistant Examiner* — Lan Huong Truong
(74) *Attorney, Agent, or Firm* — Rabin & Berdo, P.C.

(57) ABSTRACT

A method of allocating a multicast resource to a multicast group for a multicast communication in a base station is provided. The base station persistently allocates the multicast resource to the multicast group, generates a MAP IE including allocation information of the multicast resource, an allocation period indicating a period in which the multicast resource is allocated and a lifetime in which allocation of the multicast resource is maintained, and transmitting the MAP IE to the multicast group.

16 Claims, 7 Drawing Sheets

(51) Int. Cl.
  *H04W 4/06* (2009.01)
  *H04W 52/02* (2009.01)
  *H04W 76/00* (2009.01)
  *H04W 72/04* (2009.01)
  *H04W 72/12* (2009.01)

(56) References Cited

U.S. PATENT DOCUMENTS

| | | | |
|---|---|---|---|
| 7,924,703 B2 * | 4/2011 | Ji et al. | 370/216 |
| 8,670,397 B2 * | 3/2014 | Josiam et al. | 370/329 |
| 2008/0175237 A1 | 7/2008 | Kim | |
| 2008/0267104 A1 * | 10/2008 | Zhang | 370/311 |
| 2009/0086670 A1 | 4/2009 | Hart et al. | |
| 2009/0154386 A1 | 6/2009 | So et al. | |
| 2009/0180418 A1 | 7/2009 | Zhang et al. | |
| 2010/0110963 A1 | 5/2010 | Huang et al. | |
| 2010/0246531 A1 * | 9/2010 | Chang et al. | 370/331 |
| 2010/0278091 A1 | 11/2010 | Sung et al. | |
| 2010/0316008 A1 * | 12/2010 | Kim et al. | 370/329 |
| 2011/0007683 A1 * | 1/2011 | Kim et al. | 370/312 |
| 2011/0044226 A1 | 2/2011 | Song et al. | |
| 2011/0149825 A1 | 6/2011 | Lavi et al. | |
| 2012/0064898 A1 | 3/2012 | Oh | |
| 2012/0207073 A1 * | 8/2012 | Kim et al. | 370/311 |
| 2013/0040680 A1 * | 2/2013 | Kim et al. | 455/509 |

OTHER PUBLICATIONS

Eunkyung Kim et al., "Multicast Operation over WirelessMAN HR-OFDMA air interface", IEEE C802.16n-11/0121, Jul. 11, 2011.
Kim, Eunkyung, et al.; IEEE 802.16 Broadband Wireless Access Working Group, E-MBS Service Flow Update in IEEE P802.16m; Mar. 5, 2010; pp. 1-3.

* cited by examiner

FIG. 7

METHOD AND APPARATUS FOR ALLOCATING MULTICAST RESOURCE AND METHOD AND APPARATUS FOR RECEIVING MULTICAST RESOURCE ALLOCATION INFORMATION

CROSS-REFERENCE TO RELATED APPLICATION

This application claims priority to and the benefit of Korean Patent Application Nos. 10-2010-0134915, 10-2011-0019654, 10-2011-0068535, 10-2011-0112476, 10-2011-0113914 and 10-2011-0141347 filed in the Korean Intellectual Property Office on Dec. 24, 2010, Mar. 4, 2011, Jul. 11, 2011, Oct. 31, 2011, Nov. 3, 2011 and Dec. 23, 2011, respectively, the entire contents of which are incorporated herein by reference.

BACKGROUND OF THE INVENTION (a) Field of the Invention

The present invention generally relates a method and apparatus for allocating a multicast resource, and a method and apparatus for receiving allocation information of multicast resource.

(b) Description of the Related Art

A multicast communication is used to a group communication where users join in a conversation. In the group communication, the same downlink traffic is simultaneously transmitted to all the users in a group performing the group communication. Therefore, the users joining the group communication can use a multicast connection to transmit data of the group communication.

Users joining in the multicast communication persistently use the same resource in a multicast-based group communication. Therefore, if a conventional resource allocation method for allocating a resource to each user is applied to the multicast communication, frequent resource allocations are inefficiently performed. Further, since a mobile station should receive and decode a message including resource allocation information frequently, unnecessary power loss occurs.

SUMMARY OF THE INVENTION

Embodiments of the present invention provide a method and apparatus for allocating a multicast resource, and a method and apparatus for receiving allocation information of multicast resource, for a multicast communication.

According to one embodiment of the present invention, a method of allocating a multicast resource to a multicast group for a multicast communication is provided in a base station. The method includes persistently allocating the multicast resource to the multicast group, generating a MAP information element (IE) including allocation information of the multicast resource, an allocation period indicating a period in which the multicast resource is allocated and a lifetime in which allocation of the multicast resource is maintained, and transmitting the MAP IE to the multicast group.

The multicast resource may be allocated at an interval of predetermined frames, and the allocation period may include information on a number predetermined frames.

The allocation information of the multicast resource may not change until the lifetime expires.

The method may further include transmitting a next MAP IE including new allocation information on the multicast resource to the multicast group when the lifetime expires.

The next MAP IE may be transmitted at a frame or superframe whose number satisfies N modulo L+1=0, wherein the N is the number of the frame or superframe, and the L is the lifetime.

The MAP IE may further include a multicast group connection identifier that is allocated to the multicast communication.

The method may further include, before transmitting the MAP IE, generating a CRC by randomizing information of the MAP IE, masking the CRC by a CRC mask including an identifier of the multicast group, and attaching the CRC masked by the CRC mask to the MAP IE.

The method may further include performing a service connection procedure with a mobile station joining in the multicast communication. The performing the service connection procedure may include transmitting a service connection message including the allocation information of the multicast resource, the allocation period and the lifetime to the mobile station.

The method may further include transmitting a handover message including the allocation information of the multicast resource, the allocation period and the lifetime to a mobile station performing a handover.

According to another embodiment of the present invention, a method of receiving multicast resource allocation information for a multicast communication is provided in a mobile station. The method includes receiving from a base station a MAP IE including allocation information of a multicast resource that is persistently allocated to the multicast group, an allocation period indicating a period in which the multicast resource is allocated and a lifetime in which allocation of the multicast resource is maintained, and identifying whether the MAP IE is a MAP IE allocated to a multicast group to which the mobile station belongs.

The multicast resource may be allocated at an interval of predetermined frames, and the allocation period may include information on a number predetermined frames.

The allocation information of the multicast resource may not change until the lifetime expires.

The method may further include receiving a next MAP IE including new allocation information on the multicast resource to the multicast group when the lifetime expires.

The next MAP IE may be transmitted at a frame or superframe whose number satisfies N modulo L+1=0, wherein the N is the number of the frame or superframe, and the L is the lifetime.

The MAP IE may further include a multicast group connection identifier that is allocated to the multicast communication. The mobile station may identify the MAP IE using the multicast group connection identifier.

A CRC that is masked by a CRC mask including an identifier of the multicast group may be attached to the MAP IE. The mobile station may identify the MAP IE using the CRC mask.

According to yet another embodiment of the present invention, an apparatus for allocating a multicast resource to a multicast group for a multicast communication is provided. The apparatus includes a resource allocator configured to persistently allocate the multicast resource to the multicast group, and a transmitter configured to transmit to a mobile station a MAP IE including allocation information of the multicast resource, an allocation period indicating a period in which the multicast resource is allocated and a lifetime in which allocation of the multicast resource is maintained The resource allocator may not change the allocation information of the multicast resource until the lifetime expires.

According to yet another embodiment of the present invention, an apparatus for receiving allocation information of multicast resource for a multicast communication is provided. The apparatus includes a receiver configured to receive from a base station a MAP IE including allocation information of a multicast resource that is persistently allocated to the multicast group, an allocation period indicating a period in which the multicast resource is allocated and a lifetime in which allocation of the multicast resource is maintained, and a controller configured to identify whether the MAP IE is a MAP IE allocated to a multicast group to which the apparatus belongs.

The allocation information of the multicast resource may not change until the lifetime expires.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "mobile station (MS)" may designate a terminal, a mobile terminal (MT), an advanced mobile station (AMS), a high reliability mobile station (HR-MS), a subscriber station (SS), a portable subscriber station (PSS), an access terminal (AT), a user equipment (UE), and so on, or may include all or some functions thereof.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) performing base station function, a high reliability relay station (HR-RS) performing the base station function and so on, or may include all or some functions thereof.

Figure 1:
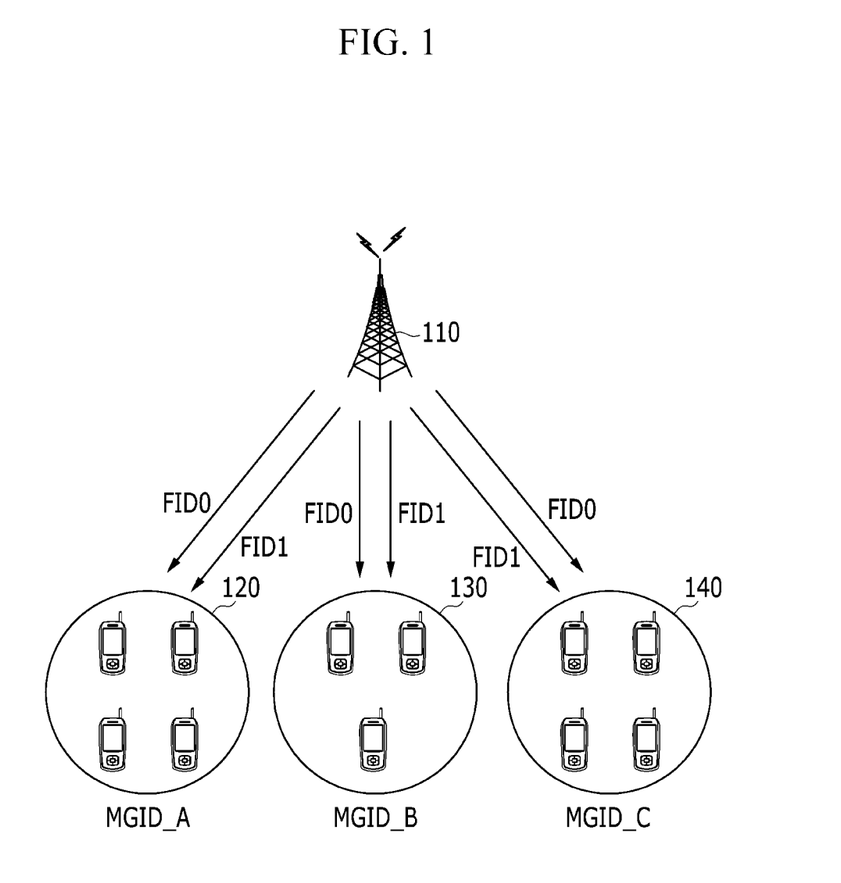
FIG. 1 to FIG. 3 show a multicast communication system according to embodiments of the present invention.

FIG. 1 shows a multicast communication system according to an embodiment of the present invention.

Referring to FIG. 1, a base station 110 uses a multicast group identifier (ID) allocated to a multicast group 120, to provide the multicast group 120 including a plurality of mobile stations with a multicast communication. The multicast group ID is uniquely allocated within the base station 110 and has a finite size. The multicast group ID is used as an ID for notifying the multicast group of the allocated resource. Other multicast groups 120, 130, and 140 have different multicast group ID MGID_A, MGID_B, and MGID_C.

The base station 110 uses a flow identifier (FID) for identifying a connection besides the multicast group ID. The base station 110 allocates the FID in each multicast group ID, thereby uniquely identifying the connection, i.e., a service flow within the multicast group. Since the FID is an ID for identifying a signal or traffic connection within the multicast group, a particular connection of the multicast group can be identified a combination of the multicast group ID and FID in the base station 110. That is, the base station 110 uses the multicast group ID and the FID to provide the multicast group 120 with a multicast service. The same FID (FID0 or FID 1) can be used in the other multicast groups 120, 130, and 140.

Figure 2:
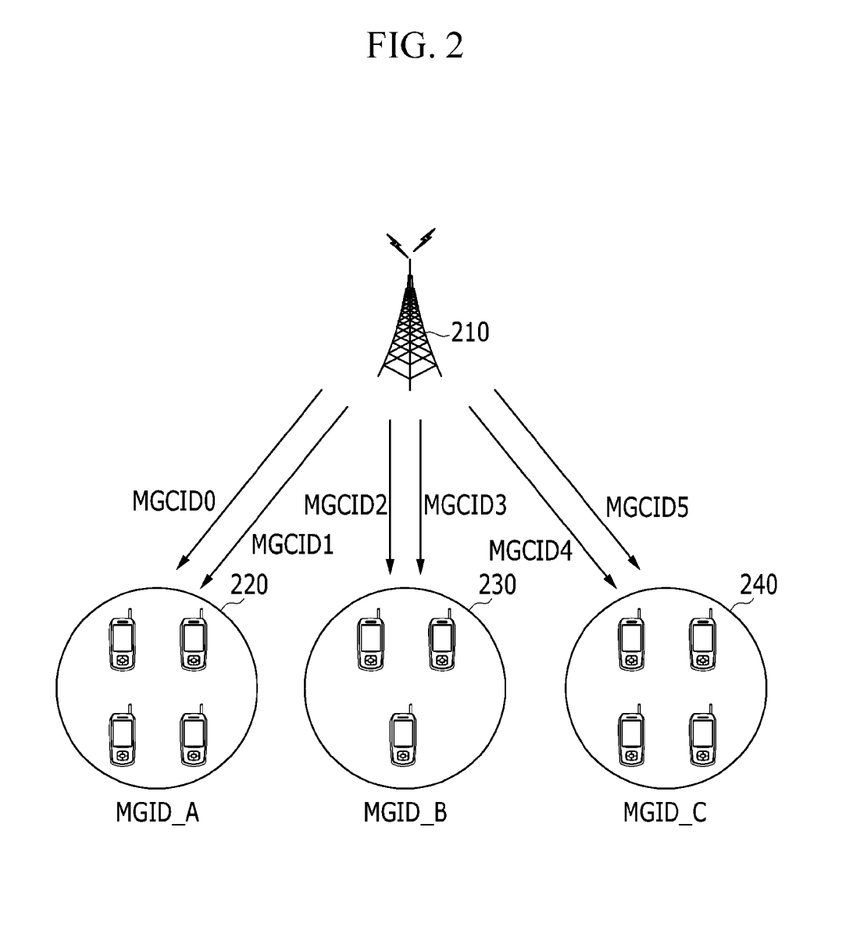

FIG. 2 shows a multicast communication system another embodiment of the present invention.

Referring to FIG. 2, a base station 210 uses a multicast group connection ID (CID) allocated to a multicast service, to provide a multicast group 120 including a plurality of mobile stations with the multicast service. The multicast group CID is uniquely allocated for identifying a connection (a service flow) within the base station 210 and has a finite size. Other multicast group CIDs (MGCID0, MGCID1, MGCID2, MGCID3, MGCID4, and MGCID5) are used in different multicast groups 220, 230, and 240. A multicast resource allocated to the multicast service can be notified to the multicast group through the multicast group CID.

Figure 3:
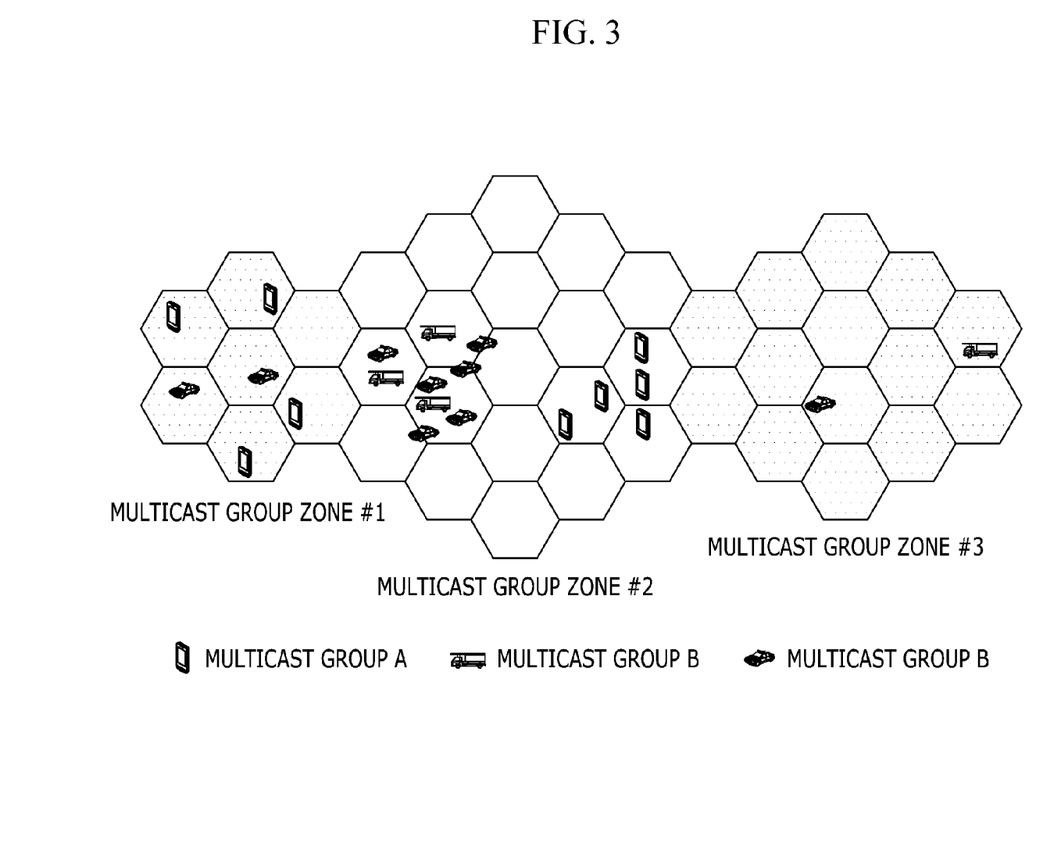

Referring to FIG. 3, a multicast group zone is defined as a set of base stations including at least one base station in a group communication system according to an embodiment of the present invention. A unique multicast group zone ID is allocated to the multicast group zone. In the multicast group zone, base stations use the same multicast group ID and FID (see an embodiment of FIG. 1) or the same multicast group CID (see an embodiment of FIG. 2) for transmitting data of a certain service flow. Accordingly, if a mobile station has already registered with a base station for a multicast service, the mobile station can be seamlessly receive the multicast service without reregistering with other base station even if the mobile station moves to the other base station within the same multicast group zone. If the mobile station moves from a base station to another base station where those base stations provide the same multicast service but they belong to different multicast group zone, the mobile station can seamlessly receive the multicast service by updating a service flow parameter.

If only one base station belong to a multicast group zone, the single base station uses a multicast group CID for providing a multicast service, independently from other base stations.

Figure 4:
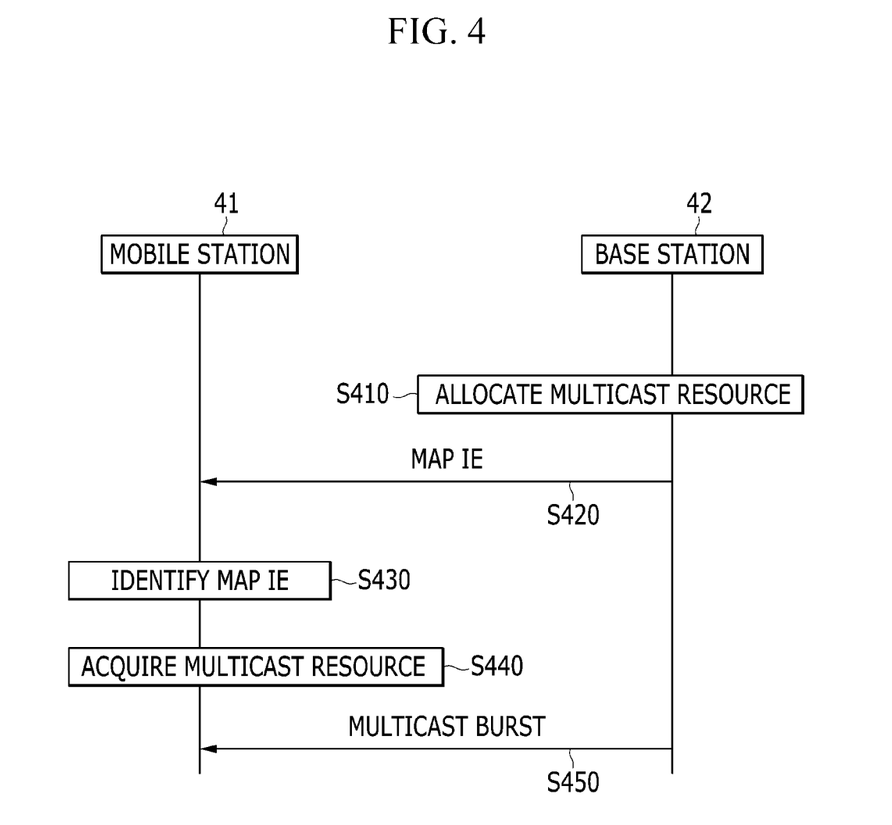
FIG. 4 and FIG. 5 show a method allocating multicast resource in a multicast communication according to an embodiment of the present invention.
Figure 5:
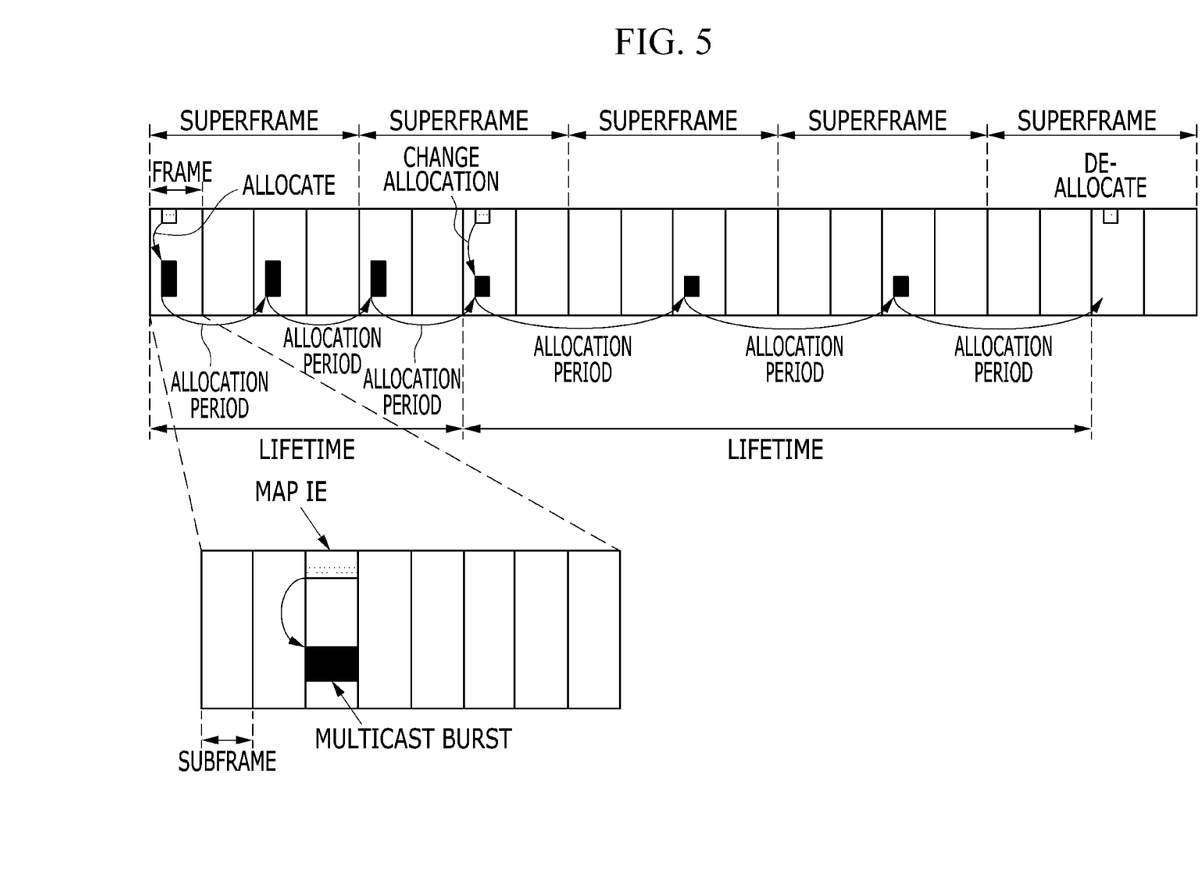

FIG. 4 and FIG. 5 each show a method allocating multicast resource in a multicast communication according to an embodiment of the present invention.

Referring to FIG. 4, a base station 42 persistently allocates a multicast resource to a multicast group for a multicast communication (S410), and transmits a downlink control channel including allocation information of multicast resource (S420). The downlink control channel may be a MAP information element (IE). For the multicast resource allocation, a new MAP IE may be defined. For example, the new MAP IE may be an HR-Multicast DL MAP IE (high reliability multicast downlink MAP IE) or an HR Multicast DL Assignment A-MAP IE that is a new type of A-MAP (advance MAP).

A mobile station 41 identifies whether the received MAP IE is a MAP IE corresponding to the multicast group to which it belongs, based on the received MAP IE (S430). The mobile station 41 acquires the persistently allocated multicast resource by the allocation information of multicast resource of the identified MAP IE (S440), and receives multicast burst through the multicast resource (S450).

As shown in FIG. 5, the base station periodically (i.e., persistently) allocates the multicast resource at an interval of predetermined frames. The interval of predetermined frames corresponds to an allocation period. A plurality of frames, for example four frames may form one superframe, and one frame may include a plurality of subframes, for example eight subframes. In this case, the base station may transmit the MAP IE at a subframe to which the multicast resource is allocated.

The MAP IE includes multicast resource information allocated for the multicast communication, the allocation period, and a lifetime. The lifetime indicates a period in which a persistent allocation is maintained, and the resource allocation information does not change until the lifetime expires. If the lifetime expires, the base station allocates a persistent resource for the multicast communication again or releases the previously allocated resource, and transmits the MAP IE including relevant information. The base station may transmit a next MAP IE at a frame whose frame number $N_{frame}$ satisfies Equation 1, or may transmit the next MAP IE at a superframe whose superframe number $N_{superframe}$ satisfies Equation 2.

$$N_{frame} \text{ modulo } L+1=0 \quad (1)$$

$$N_{superframe} \text{ modulo } L+1=0 \quad (2)$$

In Equations 1 and 2, L indicates the lifetime.

Accordingly, the mobile station can acquire information on the persistently allocated resource by only one decoding on the MAP IE such that a power loss that occurs when decoding the MAP IE can be reduced. Further, since the mobile station can know a period in which the MAP IE is transmitted or a period in which a multicast burst is transmitted in advance, the mobile station can efficiently perform a power saving when entering a power saving mode such as a sleep mode or an idle mode. Furthermore, the mobile station can know a time for decoding a new MAP IE by the lifetime included in the current MAP IE such that the mobile station can check a change of the persistently allocated resource.

In another embodiment, the base station may transmit a MAP IE including the same allocation information as previous allocation information before the lifetime expires. In this case, the base station may place a limit on a change or a release of the allocation information that it allows the change or release to be performed only when the lifetime expires. Accordingly, the base station can allow the mobile station to not unnecessarily receive and decode the resource information.

An example of FIG. 5 shows that the multicast resource is persistently allocated with the allocation period of 2 and the lifetime of 6, the multicast resource is persistently allocated with the allocation period of 4 and the lifetime of 12, and then the allocated resource is released.

Next, allocation information of multicast resource according to an embodiment of the present invention will be described with reference to Table 1 to Table 4.

A MAP IE, for example an HR-Multicast DL MAP IE includes multicast resource information and subburst IE, and the subburst IE includes an allocation period and a lifetime. The subburst IE may be an HR_Multicast_DL_Subburst_IE.

The multicast resource information may be a predefined region ID (Region ID) or OFDMA symbol information and subchannel information. The OFDMA symbol information may include an OFDMA symbol offset and the number of OFDMA symbols, and the subchannel information may include a subchannel offset and the number of subchannels.

The HR-Multicast DL MAP IE may include an extended-2 DIUC (downlink interval usage code) and an extended-3 DIUC for indicating that the MAP IE is the HR-Multicast DL MAP IE, and may include a length of the MAP IE.

The subburst IE may further include a persistent flag, an allocation flag, allocation region information, or MCS (modulation coding scheme) level information. The persistent flag indicates whether the allocation is a persistent allocation, and the allocation flag indicates allocation of a resource or de-allocation of the resource. The allocation region information indicates an allocation region within a region allocated by the MAP IE, and may include a slot offset and slot duration. The MCS level information may be provided by the DIUC. The subburst IE may further include information on the multicast connection, for example a multicast group CID. The mobile station can identify the MAP corresponding to the multicast group to which it belongs by the multicast group CID.

The HR-Multicast DL MAP IE and the HR_Multicast_DL_Subburst_IE that are examples of the MAP IE and the subburst IE may be defined as in Table 1 and Table 2.

TABLE 1

| Syntax | Size (bit) | Notes |
| --- | --- | --- |
| HR-Multicast DL MAP IE { | | |
|     Extended-2 DIUC | 4 | HR Multicast DL Map IE( ) = 0xF (Extended-3 DIUC) |
|     Length | 8 | Length in bytes |
|     Extended-3 DIUC | 4 | 0x01 |
|     Region ID Indicator | 1 | 0: not use Region_ID<br>1: use Region_ID |
|     If (Region_ID use indicator == 0) { | | |
|         OFDMA symbol offset | 8 | Offset from the start of DL subframe |
|         Subchannel offset | 7 | |
|         Number of OFDMA symbols | 7 | |
|         Number of subchannels | 7 | |
|         Rectangular subburst Indication | 1 | Indicates subburst allocations are time-first rectangular. The duration field in each subburst IE specifies the number of subchannels for each rectangular allocation. This is only valid for AMC allocations and all allocations with dedicated pilots. When this field is clear, subbursts shall be allocated in |

TABLE 1-continued

| Syntax | Size (bit) | Notes |
|---|---|---|
|       Reserved<br>   } else<br>      Region_ID<br>   }<br>   HR_Multicast_DL_Subburst_IE( )<br>Padding<br>} | 2<br><br>8<br><br>variable<br>variable | frequency-first manner and the duration field reverts to the default operation.<br><br>Index to the DL region defined in DL region definition TLV in DCD<br><br>Table 2<br>Padding to byte for the unspecified portion of this IE (i.e. not including the first two fields, "Extended-2 DIUC" and "Length"); shall be set to 0. |

TABLE 2

| Syntax | Size (bit) | Notes |
|---|---|---|
| HR_Multicast_DL_Subburst_IE( ) {<br>  N subburst | <br>4 | <br>Number of subbursts in the 2D rectangular region is this field value plus 1. |
|   Resource shifting indicator | 1 | 0 = No Resource shifting<br>1 = Resource shifting |
|   For(j=0;j<Number of subbursts;j++){<br>    Allocation Flag | <br><br>1 | <br><br>1 = allocate<br>0 = de-allocate |
|     Group Indicator | 1 | TDD mode: Reserved, set to 0.<br>Used for FDD/H-FDD case only; to indicate the group assignment of the MS (see 8.4.4.2 and 8.4.4.2.1)<br>0b0: Group #1<br>0b1: Group #2 |
|     If (Allocation Flag == 0) {<br>      HR Multicast Group CID<br>      If (Resource shifting indicator == 1) {<br>        Duration | <br>16<br><br><br>variable | // deallocate<br><br><br><br>Duration in slots. OFDMA Frame duration dependent<br>7 bits—2.5 ms frame<br>8 bits—5 ms frame<br>9 bits—10 ms frame<br>10 bits—20 ms frame |
|         Slot Offset | variable | Indicates the start of this persistent allocation in OFDMA slots, with respect to the lowest numbered OFDM symbol and the lowest numbered subchannel in the region.<br>OFDMA Frame duration dependent<br>7 bits—2.5 ms frame<br>8 bits—5 ms frame<br>9 bits—10 ms frame<br>10 bits—20 ms frame |
|       }<br>    } else if (Allocation Flag == 1) {<br>      HR Multicast Group CID<br>      Persistent Flag | <br><br>16<br>1 | <br>// allocate<br><br>0 = Non-persistent<br>1 = Persistent |
|       if( Power boost per subburst == 1 ){<br>        Boosting | <br><br>1 | <br><br>0b000: Normal (not boosted)<br>0b001: +6 dB<br>0b010: −6 dB<br>0b011: +9 dB<br>0b100: +3 dB<br>0b101: −3 dB<br>0b110: −9 dB<br>0b111: −12 dB;<br>Note that if the Persistent flag is set, the boosting value applies to each instance of the persistent allocation |
|       } | | |

TABLE 2-continued

| Syntax | | Size (bit) | Notes |
|---|---|---|---|
| | Duration | variable | Duration in slots. OFDMA Frame duration dependent<br>7 bits—2.5 ms frame<br>8 bits—5 ms frame<br>9 bits—10 ms frame<br>10 bits—20 ms frame |
| | Slot Offset | variable | Indicates the start of this persistent allocation in OFDMA slots, with respect to the lowest numbered OFDM symbol and the lowest numbered subchannel in the region. OFDMA Frame duration dependent<br>7 bits—2.5 ms frame<br>8 bits—5 ms frame<br>9 bits—10 ms frame<br>10 bits—20 ms frame |
| | If (Persistent Flag == 1) { | | |
| |   Allocation Period (ap) | 5 | Period of the persistent allocation is this field value plus 1 (unit is frame) |
| |   Lifetime(L) | 4 | Indicates the time to transmit the information of this allocation and the information does not change until lifetime expires. The next transmission of information is at the frame whose frame number, $N_{frame}$, satisfies the following condition.<br>$N_{frame}$ modulo $L + 1 = 0$ |
| | } else | | |
| |   Next allocation offset | 5 | 5LSBs of frame number and it indicates next allocation of the allocation of this field |
| | } | | |
| | DIUC | 4 | |
| | Repetition Coding Indication | 2 | 0b00: No Repetition coding<br>0b01: Repetition coding of 2 used<br>0b10: Repetition coding of 4 used<br>0b11: Repetition coding of 6 used |
| } | | | |
| } | | | |
| Padding | | variable | Padding to nibble; shall be set to 0. |
| } | | | |

The base station may add the above subburst IE (HR_Multicast_DL_Subburst_IE) to a hybrid automatic repeat request (HARQ) downlink MAP (HARQ DL MAP) for an HARQ resource allocation or a Persistent HARQ DL MAP for an HARQ persistent resource allocation, and use them for the multicast communication. For example, the HARQ DL MAP IE and the Persistent HARQ DL MAP IE may be defined as in Table 3 and Table 4.

TABLE 3

| Syntax | Size (bit) | Notes |
|---|---|---|
| HARQ_DL_MAP_IE( ) { | | |
|   Extended-2 DIUC | 4 | HARQ_DL_MAP_IE( ) = 0x7 |
|   Length | 8 | Length in bytes |
|   RCID_Type | 2 | 0b00: Normal CID<br>0b01: RCID11<br>0b10: RCID7<br>0b11: RCID3<br>For HR Multicast, RCID_Type is set to 0b00 and Normal CID is replaced by HR Multicast Group CID |
|   ACK region index | 1 | The index of the ACK region associated with all subbursts (except HR multicast DL burst) defined in this HARQ DL map IE (FDD/H-FDD only).<br>0: first ACK region<br>1: second ACK region<br>This bit shall be set to 0 for TDD mode. |
|   Reserved | 1 | |
|   While (data remains) { | | |
|     Boosting | 3 | 0b000: Normal (not boosted)<br>0b001: +6 dB<br>0b010: −6 dB<br>0b011: +9 dB<br>0b100: +3 dB<br>0b101: −3 dB |

TABLE 3-continued

| Syntax | Size (bit) | Notes |
|---|---|---|
| | | 0b110: −9 dB |
| | | 0b111: −12 dB; |
| Region_ID use indicator | 1 bit | 0: not use Region_ID |
| | | 1: use Region_ID |
| If (Region_ID use indicator == 0 ) { | | |
|   OFDMA symbol offset | 8 | Offset from the start symbol of DL subframe |
|   Subchannel offset | 7 | |
|   Number of OFDMA symbols | 7 | |
|   Number of subchannels | 7 | |
|   Rectangular subburst Indication | 1 | Indicates subburst allocations are time-first rectangular. The duration field in each subburst IE specifies the number of subchannels for each rectangular allocation. This is only valid for AMC allocations and all allocations with dedicated pilots. When this field is clear, subbursts shall be allocated in frequency-first manner and the duration field reverts to the default operation. |
|   Reserved | 2 | |
| } else { | | |
|   Region_ID | 8 | Index to the DL region defined in DL region definition TLV in DCD |
| } | | |
| Mode | 4 | Indicates the mode of this HARQ region: |
| | | 0b0000: Chase HARQ |
| | | 0b0001: Incremental redundancy HARQ for CTC |
| | | 0b0010: Incremental redundancy HARQ for Convolutional Code 0b0011: MIMO Chase HARQ |
| | | 0b0100: MIMO IR HARQ |
| | | 0b0101: MIMO IR HARQ for Convolutional Code |
| | | 0b0110: MIMO STC HARQ |
| | | 0b0111: HR Multicast DL subburst |
| | | 0b1000-0b1111: Reserved |
| Subburst IE Length | 8 | Length, in nibbles, to indicate the size of the sub-burst IE in this HARQ mode. The MS may skip DL HARQ Subburst IE if it does not support the HARQ mode. However, the MS shall decode NACK Channel field from each DL HARQ Subburst IE to determine the UL ACK channel it shall use for its DL HARQ burst. |
| If (Mode == 0b0000) { | | |
|   DL_HARQ_Chase_subburst_IE( ) | variable | |
| } else if (Mode == 0b0001) { | | |
|   DL_HARQ_IR_CTC_subburst_IE( ) | variable | |
| } else if (Mode == 0b0010) { | | |
|   DL_HARQ_IR_CC_subburst_IE( ) | variable | |
| } else if (Mode == 0b0011) { | | |
|   MIMO_DL_Chase_HARQ_subburst_IE( ) | variable | |
| } else if (Mode == 0b0100) { | | |
|   MIMO_DL_IR_HARQ_subburst_IE( ) | variable | |
| } else if (Mode == 0b0101) { | | |
|   MIMO_DL_IR_HARQ_for_CC_subburst_IE( ) | variable | |
| } else if (Mode == 0b0110) { | | |
|   MIMO_DL_STC_HARQ_subburst_IE( ) | variable | |
| } elseif (Mode == 0b0111){ | | |
|   HR Multicast DL subburst IE | variable | Table 2 |
| } | | |
| } | | |
| Padding | variable | Padding to byte for the unspecified portion of this IE, i.e., not including the first two fields, "Extended-2 DIUC" and "Length"; shall be set to 0 |
| } | | |

TABLE 4

| Syntax | Size (bit) | Notes |
|---|---|---|
| Persistent_HARQ_DL_MAP_IE( ) { | | |
|     Extended-2 DIUC | 4 | Persistent_HARQ_DL_MAP_IE = 0xD |
|     Length | 8 | Length in bytes |
|     RCID_Type | 2 | 0b00: Normal CID |
| | | 0b01: RCID11 |
| | | 0b10: RCID7 |
| | | 0b11: RCID3 |
| | | For HR Multicast, RCID_Type is set to 0b00 and Normal CID is replaced by HR Multicast Group CID |
|     ACK Region Index | 1 | The index of the ACK region associated with all subbursts (except HR multicast DL burst) defined in this Persistent HARQ DL MAP (FDD/H-FDD only) |
|     while (data_remains){ | | |
|         Region ID use indicator | 1 | 0: Region ID not used |
| | | 1: Region ID used |
|         Change Indicator | 1 | 0: No change occurred |
| | | 1: Change occurred |
|         if (Region ID use indicator == 0){ | | |
|             OFDMA Symbol offset | 8 | |
|             Subchannel offset | 7 | |
|             Number of OFDMA symbols | 7 | |
|             Number of subchannels | 7 | |
|             Rectangular subburst indication | 1 | Indicates subburst allocations are time-first rectangular. The duration field in each subburst IE specifies the number of subchannels for each rectangular allocation. The slot offset field in each subburst IE specifies the subchannel offset from the first subchannel for each rectangular allocation. When this field is clear, subbursts shall be allocated in frequency-first manner and the duration field reverts to the default operation |
|         } | | |
|         else{ | | |
|             Region ID | 8 | Index to the DL region defined in DL region definition TLV in DCD |
|         } | | |
|         Power boost per subburst | 1 | Set to 1 to signal power boost per subburst. This field shall be set to 0 if Rectangular subburst indication is set to 0 |
|         if (Power boost per subburst == 0){ | | |
|             Boosting | 3 | 0b000: Normal (not boosted) |
| | | 0b001: +6 dB |
| | | 0b010: −6 dB |
| | | 0b011: +9 dB |
| | | 0b100: +3 dB |
| | | 0b101: −3 dB |
| | | 0b110: −9 dB |
| | | 0b111: −12 dB |
| | | Note that if the Persistent flag is set, the boosting value applies to each allocation instance of the persistent allocation |
|         } | | |
|         Mode | 4 | Indicates the mode in this HARQ region |
| | | 0b0000: Persistent DL Chase HARQ |
| | | 0b0001: Persistent DL Incremental redundancy HARQ for CTC |
| | | 0b0010: Persistent DL Incremental redundancy HARQ for Convolutional Code |
| | | 0b0011: Persistent MIMO DL Chase HARQ |
| | | 0b0100: Persistent MIMO DL IR HARQ |
| | | 0b0101: Persistent MIMO DL IR HARQ for Convolutional Code |
| | | 0b0110: Persistent MIMO DL STC HARQ |
| | | 0b0111: HR Multicast DL subburst |
| | | 0b1000 to 0b1111: Reserved |
|         Subburst IE Length | 8 | Length, in nibbles, to indicate the size of the subburst IE in this HARQ mode. The MS may skip DL HARQ Subburst IE if it does not |

TABLE 4-continued

| Syntax | Size (bit) | Notes |
|---|---|---|
| | | support the HARQ mode. However, the MS shall decode NACK Channel field from each DL HARQ Subburst IE to determine the UL ACK channel it shall use for its DL HARQ burst |
| if( Mode == 0b0000){ Persistent DL Chase HARQ subburst IE | variable | |
| } elseif (Mode == 0b0001){ Persistent DL Incremental redundancy HARQ for CTC subburst IE | variable | |
| } elseif (Mode == 0b0010){ Persistent DL Incremental redundancy HARQ for Convolutional Code | variable | |
| } elseif (Mode == 0b0011){ Persistent MIMO DL Chase HARQ | variable | |
| } elseif (Mode == 0b0100){ Persistent MIMO DL IR HARQ | variable | |
| } elseif (Mode == 0b0101){ Persistent MIMO DL IR HARQ for Convolutional Code | variable | |
| } elseif (Mode == 0b0110){ Persistent MIMO DL STC HARQ | variable | |
| } elseif (Mode ==0b0111){ HR Multicast DL subburst IE } } | variable | Table 2 |
| Padding } | variable | Padding to byte for the unspecified portion of this IE (i.e., not including the first two fields, "Extended-2 DIUC" and "Length"); shall be set to 0. |

Since fields that are not described in Table 1 to Table 4 are defined in for example IEEE Std 802.16-2009, descriptions for the fields are omitted.

Next, multicast resource allocation information according to another embodiment of the present invention will be described with reference to Table 5.

A base station may generate a multicast allocation A-MAP IE for allocating a multicast resource using an A-MAP, and the multicast allocation A-MAP IE may be for example an HR-Multicast DL Assignment A-MAP IE.

The multicast allocation A-MAP IE includes an allocation period, a lifetime, and multicast allocation information as described above. The multicast allocation information may include a resource index indicating a location and a size of the multicast resource. The multicast allocation information may further include information (Isizeoffset) used to compute a burst size index and an indicator (long TTI indicator) indicating the number of subframes spanned by the allocated resource.

The multicast allocation A-MAP IE may inform whether the A-MAP IE is allocation of a resource or de-allocation of the resource by a value of the allocation period, without using a flag for indicating the allocation or the de-allocation. For example, when the allocation period has a value of "00", the A-MAP IE may indicate the de-allocation.

The base station may generate 16-bit cyclic redundancy check (CRC) based on the randomized sequence of information bits of the multicast allocation A-MAP IE. Further, the base station may mask the 16-bit CRC by a CRC mask including a multicast group ID, and attach the masked CRC to the multicast allocation A-MAP IE. The terminal can identify the multicast allocation A-MAP IE using the CRC mask including the multicast group ID to which it belongs. That is, the mobile station can identify the multicast allocation A-MAP IE corresponding to the multicast group to which it belongs using the CRC mask.

The HR-Multicast DL Assignment A-MAP IE that is an example of the multicast allocation A-MAP IE may be defined as in Table 5.

TABLE 5

| Syntax | Size (bit) | Description/Notes |
|---|---|---|
| HR-Multicast_DL_Assignment_A-MAP_IE( ) { | | |
| A-MAP IE Type | 4 | HR-Multicast DL Assignment A-MAP IE |
| Allocation period | 2 | Period of persistent allocation of multicast resource. If (Allocation Period == 0b00), it indicates |

TABLE 5-continued

| Syntax | Size (bit) | Description/Notes |
|---|---|---|
| | | the deallocation of persistent resource.<br>0b00: deallocation<br>0b01: 2 frames<br>0b10: 4 frames<br>0b11: 6 frames |
| If (Allocation Period == 0b00) {<br>  Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size. |
|   Long TTI Indicator | 1 | Indicates number for AAI subframes spanned by the allocated resource.<br>0b0: 1 AAI subframe (default TTI)<br>0b1: 4 DL AAI subframe for FDD or all DL AAI subframes for TDD (long TTI) |
|   Reserved | 22 | |
| } else if(Allocation Period != 0b00) {<br>  Isizeoffset | 5 | Offset used to compute burst size index |
|   MEF | 2 | MIMO encoder format<br>0b00: SFBC<br>0b01: Vertical encoding<br>0b10: Multi-layer encoding<br>0b11: CDR |
|   If (MEF == 0b01) {<br>    $M_t$ | 3 | Parameter for vertical encoding<br>Number of streams in transmission $M_t <= N_t$<br>$N_t$: Number of transmit antennas at the HR-BS<br>0b000: 1stream<br>0b001: 2streams<br>0b010: 3streams<br>0b011: 4streams<br>0b100: 5streams<br>0b101: 6streams<br>0b110: 7streams<br>0b111: 8streams |
|     Reserved | 1 | |
|   } else if (MEF == 0b10) {<br>    Si | 4 | Parameters for multi-layer encoding<br>Index to identify the combination of the number of streams and the allocated pilot stream index in a transmission with MU-MIMO, and the modulation constellation of paired user in the case of 2 stream transmission<br>0b0000: 2 streams with PSI = stream1 and other modulation = QPSK<br>0b0001: 2 streams with PSI = stream1 and other modulation = 16QAM<br>0b0010: 2 streams with PSI = stream1 and other modulation = 64QAM<br>0b0011: 2 streams with PSI = stream1 and other modulation information not available<br>0b0100: 2 streams with PSI = stream2 and other modulation = QPSK<br>0b0101: 2 streams with PSI = stream2 and other modulation = 16QAM<br>0b0110: 2 streams with PSI = stream2 and other modulation = 64QAM<br>0b0111: 2 streams with PSI = stream2 and other modulation information not available<br>0b1000: 3 streams with PSI = stream1<br>0b1001: 3 streams with PSI = stream2<br>0b1010: 3 streams with PSI = stream3<br>0b1011: 4 streams with PSI = stream1<br>0b1100: 4 streams with PSI = stream2<br>0b1101: 4 streams with PSI = stream3<br>0b1110: 4 streams with PSI = stream4<br>0b1111: n/a |
|   }<br>  Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size. |

TABLE 5-continued

| Syntax | Size (bit) | Description/Notes |
|---|---|---|
| Long TTI Indicator | 1 | Indicates number for AAI subframes spanned by the allocated resource. 0b0: 1 AAI subframe (default TTI) 0b1: 4 DL AAI subframe for FDD or all DL AAI subframes for TDD (long TTI) |
| Lifetime(L) | 4 | Indicates the time to transmit next HR-Multicast DL Assignment A-MAP and the information of this HR-Multicast DL Assignment A-MAP does not change during the allocation duration. The next HR-Multicast DL Assignment A-MAP is at the superframe whose superframe number, $N_{superframe}$, satisfies the following condition. $N_{superframe}$ modulo L + 1 = 0 |
| Reserved } } | 7 | |

Since fields that are not described in Table 5 are defined in for example IEEE Std 802.16-2009, descriptions for the fields are omitted.

In yet another embodiment, for a mobile station joining a multicast service before a lifetime expires, a base station may provide allocation information of multicast resource in a service connection procedure with the mobile station, i.e., a dynamic service addition (DSA) procedure. A message associated with the service connection procedure which the base station transmits to the mobile station, i.e., a DSA request (DSA-REQ) message or a DSA response (DSA-RSP) message may include allocation information of multicast resource.

In yet another embodiment, for a mobile station performing a handover before a lifetime expires, a base station may add allocation information of multicast resource to a message associated with the handover.

Next, a resource allocation apparatus for performing a method of resource allocation according to an embodiment of the present invention will be described with reference to FIG. 6.

Figure 6:
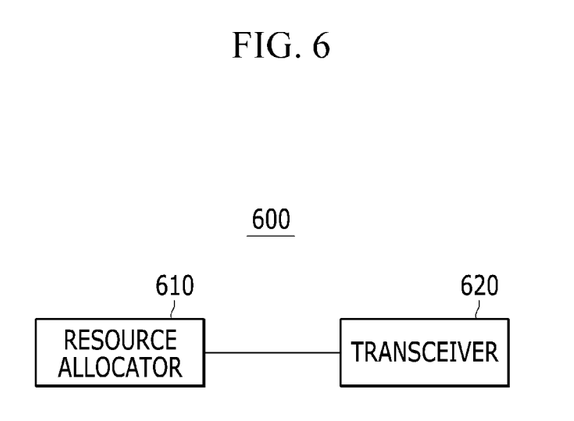
FIG. 6 is a block diagram of an apparatus allocating resource according to an embodiment of the present invention.

FIG. 6 is a block diagram of a apparatus of resource allocation according to an embodiment of the present invention.

Referring to FIG. 6, an apparatus of resource allocation 600 includes a resource allocator 610 and a transmitter 620.

The resource allocator 610 persistently allocates a multicast resource to a multicast group, and generates a MAP IE including allocation information, an allocation period and a lifetime of the multicast resource. As described above, the MAP IE may include a multicast group CID, or a CRC that is masked by a CRC mask including the multicast group ID may be added to the MAP IE.

The transmitter 620 transmits the MAP IE in a multicast group.

The apparatus of resource allocation 600 may be included in a base station or may be the base station itself.

Next, an apparatus receiving resource allocation information according to an embodiment of the present invention will be described with reference to FIG. 7.

Figure 7:
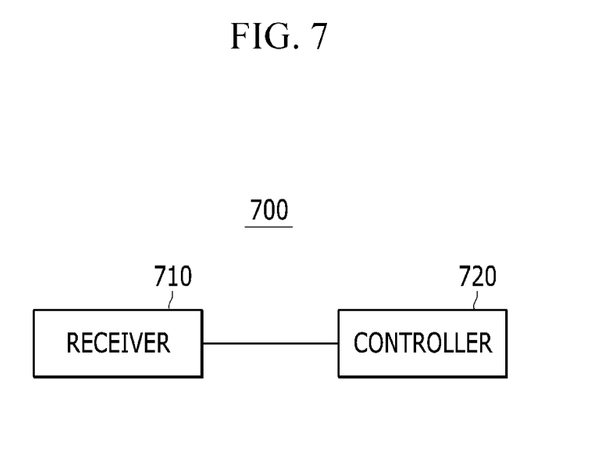
FIG. 7 is a block diagram of an apparatus receiving allocation information of resource according to an embodiment of the present invention.

FIG. 7 is a block diagram of an apparatus receiving allocation information of resource according to an embodiment of the present invention.

Referring to FIG. 7, an apparatus receiving allocation information of resource 700 includes a receiver 710 and a controller 720.

The receiver 710 receives a MAP IE transmitted by a base station. The MAP IE includes allocation information, an allocation period and a lifetime of a multicast resource that is persistently allocated to a multicast group. Further, the MAP IE may include a multicast group CID, or a CRC that is masked by a CRC mask including the multicast group ID may be added to the MAP IE.

The controller 720 identifies whether the MAP IE is a MAP IE corresponding to the multicast group to which it belongs using the multicast group CID or the CRC mask, and acquires the multicast resource by the identified MAP IE.

The apparatus receiving allocation information of resource 700 may be included in a mobile station or may be the mobile station.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating a multicast resource to a multicast group for a multicast communication in a base station, the method comprising:

persistently allocating the multicast resource to the multicast group;

generating a MAP information element (IE) including allocation information of the multicast resource, an allocation period indicating a period in which the multicast resource is allocated, and a lifetime indicating a time for transmitting a next MAP IE;

transmitting the MAP IE to the multicast group; and transmitting the next MAP IE including new allocation information on the multicast resource to the multicast group when the lifetime expires, wherein the next MAP IE is transmitted at a frame or superframe whose number satisfies N modulo L+1=0, where N is the number of the frame or superframe, and L is the lifetime.

2. The method of claim 1, wherein the multicast resource is allocated at an interval of predetermined frames, and the allocation period includes information on a number predetermined frames.

3. The method of claim 1, wherein the allocation information of the multicast resource does not change until the lifetime expires.

4. The method of claim 1, wherein the MAP IE further includes a multicast group connection identifier that is allocated to the multicast communication.

5. The method of claim 1, further comprising:
before transmitting the MAP IE,
generating a CRC by randomizing information of the MAP IE;
masking the CRC by a CRC mask including an identifier of the multicast group; and
attaching the CRC masked by the CRC mask to the MAP IE.

6. The method of claim 1, further comprising performing a service connection procedure with a mobile station joining in the multicast communication,
wherein performing the service connection procedure comprises transmitting a service connection message including the allocation information of the multicast resource, the allocation period and the lifetime to the mobile station.

7. The method of claim 1, further comprising transmitting a handover message including the allocation information of the multicast resource, the allocation period and the lifetime to a mobile station performing a handover.

8. A method of receiving allocation information of multicast resource for a multicast communication in a mobile station, the method comprising:
receiving a MAP IE from a base station, the MAP IE including allocation information of a multicast resource that is persistently allocated to the multicast group, an allocation period indicating a period in which the multicast resource is allocated, and a lifetime indicating a time for transmitting a next MAP IE;
identifying whether the MAP IE is a MAP IE allocated to a multicast group to which the mobile station belongs; and
receiving the next MAP IE including new allocation information on the multicast resource to the multicast group when the lifetime expires,
wherein the next MAP IE is transmitted at a frame or superframe whose number satisfies N modulo L+1=0, where N is the number of the frame or superframe, and L is the lifetime.

9. The method of claim 8, wherein the multicast resource is allocated at an interval of predetermined frames, and the allocation period includes information on a number predetermined frames.

10. The method of claim 8, wherein the allocation information of the multicast resource does not change until the lifetime expires.

11. The method of claim 8, wherein the MAP IE further includes a multicast group connection identifier that is allocated to the multicast communication, and
wherein the mobile station identifies the MAP IE using the multicast group connection identifier.

12. The method of claim 8, wherein a CRC that is masked by a CRC mask including an identifier of the multicast group is attached to the MAP IE, and
wherein the mobile station identifies the MAP IE using the CRC mask.

13. An apparatus for allocating a multicast resource to a multicast group for a multicast communication, the apparatus comprising:
a resource allocator configured to persistently allocate the multicast resource to the multicast group; and
a transmitter configured to transmit to a mobile station a MAP IE including allocation information of the multicast resource, an allocation period indicating a period in which the multicast resource is allocated, and a lifetime indicating a time for transmitting a next MAP IE, and configured to transmit the next MAP IE including new allocation information on the multicast resource to the multicast group when the lifetime expires,
wherein the next MAP IE is transmitted at a frame or superframe whose number satisfies N modulo L+1=0, where N is the number of the frame or superframe, and L is the lifetime.

14. The apparatus of claim 13, wherein the resource allocator does not change the allocation information of the multicast resource until the lifetime expires.

15. An apparatus for receiving multicast resource allocation information for a multicast communication, the apparatus comprising:
a receiver configured to receive from a base station a MAP IE including allocation information of a multicast resource that is persistently allocated to the multicast group, an allocation period indicating a period in which the multicast resource is allocated, and a lifetime indicating a time for transmitting a next MAP IE, and configured to receive the next MAP IE including new allocation information on the multicast resource to the multicast group when the lifetime expires, and
a controller configured to identify whether the MAP IE is a MAP IE allocated to a multicast group to which the apparatus belongs,
wherein the next MAP IE is transmitted at a frame or superframe whose number satisfies N modulo L+1=0, where N is the number of the frame or superframe, and L is the lifetime.

16. The apparatus of claim 15, wherein the allocation information of the multicast resource does not change until the lifetime expires.

* * * * *